United States Patent [19]

Yusa et al.

[11] 4,275,178

[45] Jun. 23, 1981

[54] POWDERY GRAFT-COPOLYMER COMPOSITION

[75] Inventors: Haruhiko Yusa; Masanori Oota; Katsumi Suzuki, all of Iwaki, Japan

[73] Assignee: Kureha Kagaku Kogyo Kabushiki Kaisha, Tokyo, Japan

[21] Appl. No.: 108,278

[22] Filed: Dec. 28, 1979

[30] Foreign Application Priority Data

Dec. 29, 1978 [JP] Japan ................. 53/162274

[51] Int. Cl.$^3$ ................. C08L 51/04; C08L 55/02
[52] U.S. Cl. ................. 525/71; 525/72; 525/83; 525/84; 525/87
[58] Field of Search ................. 525/71, 72, 83, 84, 525/87

[56] References Cited

U.S. PATENT DOCUMENTS 3,780,134  12/1973  Lonning ................. 525/71
4,009,227  2/1977   Ott et al. ................. 525/71

*Primary Examiner*—J. Ziegler
*Attorney, Agent, or Firm*—Wenderoth, Lind & Ponack

[57] ABSTRACT

Graft-copolymers for improving impact strength comprising a relatively large quantity of an elastomeric trunk polymer, such as acrylonitrile/styrene/butadiene resins and methyl methacrylate/styrene/butadiene resins, have some undesirable powder characteristics, for example, poor fluidity and an easily blocking property.

However, by blending a graft-copolymer of this type with a graft-copolymer comprising a relatively small quantity of an elastomeric trunk polymer in slurry form or dry state, it is possible to obtain a graft-copolymer blend with improved powder characteristics without significantly lowering the effect of improving the impact strength of the former graft-copolymer.

The graft-copolymer blend thus obtained, when blended with a hard resin such as polyvinyl chloride, provides a resin composition with high impact strength.

8 Claims, No Drawings

POWDERY GRAFT-COPOLYMER COMPOSITION

BACKGROUND OF THE INVENTION

The present invention relates to a powdery graft-copolymer blend possessing improved powder characteristics. More particularly, the invention relates to a powdery graft-copolymer with improved powder characteristics obtained by blending in slurry form or dry state a given ratio of graft-copolymers (A) and (B) comprising different quantities of elastomeric trunk polymers, each of the graft-copolymers having been obtained by emulsion graft-polymerizing a hard-resin producing monomer on the elastomeric trunk polymer.

Hard resins such as vinyl chloride resins, styrene resins, acrylonitrile-styrene resins, and methyl methacrylate resins are widely used because of their rigidity, transparency and processability. However, these resins are very brittle on the other hand, and thus are generally blended with graft-copolymers obtained by adding acrylonitrile and styrene, or methyl methacrylate and styrene to an elastomeric trunk polymer such as polybutadiene and subjecting both the monomers and the trunk polymer to polymerization (hereinafter referred to as ABS resins or MBS resins) in order to obtain improved impact strength.

The graft-copolymers of this type are widely used because of their remarkable effect of improving impact strength without impairing the desired properties of the resin to be blended therewith. These graft-copolymers are prepared through emulsion polymerization, and the latex obtained is coagulated with an acid or a salt, and then dehydrated and dried to obtain a powder. The graft-copolymer in powder form often gives rise to difficulties in handling due to agglomeration of powders during storage, i.e. a blocking phenomenon, or clogging of transportation lines caused by poor fluidity. In recent years when time and labor saving is encouraged by the powder weighing automation system and mass transportation systems, an improvement in powder characteristics including a blocking property, fluidity and bulk density is urgently needed.

To date, various methods for improving powder characteristics have been proposed. Examples of such methods are: those which involve granulating by spray-drying a graft-copolymer latex;
those which involve controlling conditions under which a copolymer latex is coagulated with an acid or a salt (coagulating conditions); or those which involve treating the surface of a copolymer powder with various additives such as lubricants and plasticizers.

However, these prior art methods have serious drawbacks in that the modified graft-copolymer obtained still possesses unsatisfactory powder characteristics or that, even if its powder characteristics are improved, its innate properties deteriorate inasmuch as its impact strength or effect of imparting high impact strength to a hard resin is lowered, or its transparency, processability or heat stability is impaired.

SUMMARY OF THE INVENTION

An object of the present invention is to provide a powdery graft-copolymer blend possessing improved powder characteristics.

Another object of the invention is to provide a powdery graft-copolymer blend wherein powder characteristics have been improved while the expected impact strength, transparency and processability of the graft-copolymer are not seriously impaired.

Still another object of the invention is to provide a resin composition with improved impact strength comprising a graft-copolymer possessing excellent powder characteristics and a hard resin.

As a result of our extensive research conducted with a view to overcoming the above described drawbacks of the prior art methods, it has been found that the aforesaid objects can be achieved by the use of a graft-copolymer blend obtained by adding a graft-copolymer for improving powder characteristics comprising a relatively small quantity of an elastomeric trunk polymer to a graft-copolymer possessing high impact strength such as an ABS resin or MBS resin in a specific ratio, and blending these graft-copolymers together.

The powdery graft-copolymer composition according to this invention comprises a blend of 100 parts of a graft-copolymer (A) comprising 50 to 80% of an elastomeric trunk polymer, and 50 to 20% of a branch polymer of a hard-resin producing monomer grafted on the elastomeric trunk polymer; and 0.1 to 25 parts of a graft-copolymer (B) comprising 5 to 49% of an elastomeric trunk polymer, and 95 to 51% of a branch polymer of a hard-resin producing monomer, both the graft-copolymers (A) and (B) having been obtained through emulsion graft-copolymerization, all quantities in parts and percentages set forth above and elsewhere herein being by weight.

The resin composition with improved impact strength according to this invention comprises the powdery copolymer composition described above and a hard resin.

DETAILED DESCRIPTION OF THE INVENTION

The graft-copolymer (A) to be improved in powder characteristics can be obtained by first preparing a latex of 50 to 80 parts of an elastomeric trunk polymer by ordinary emulsion polymerization, and subsequently adding 50 to 20 parts of a hard-resin producing monomer to the latex obtained so that the total quantity of the graft-copolymer will amount to 100 parts and subjecting both to graft-polymerization.

The process for producing this graft-copolymer is described in detail in Japanese Patent Nos. 22629/1970, 31462/1971, 18621/1974, 40142/1975, and 3667/1977 which are incorporated herein by reference, but is not limited thereto.

For the elastomeric trunk polymer, polymers of diene monomers such as butadiene, isoprene, and chloroprene; polymers of alkyl acrylates having 4 to 10 carbon atoms in the alkyl group such as butyl acrylate and octyl acrylate; and copolymers of diene monomers or alkyl acrylates having 4 to 10 carbon atoms and monomers copolymerizable therewith can be used, and examples of such monomers are aromatic vinyl compounds such as styrene and α-methyl styrene; alkyl methacrylates such as methyl methacrylate and ethyl methacrylate; alkyl acrylates having 1 to 3 cabon atoms in the alkyl group such as methyl acrylate and ethyl acrylate; and vinyl cyanides such as acrylonitrile and methacrylonitrile.

The branch polymer comprises polymer units of the hard-resin producing monomer. The term "hard resin" as used herein is intended to mean a thermoplastic polymer or copolymer which has a glass-transition temperature above room temperature, and the term "hard-resin producing monomer" as used herein is intended to mean a monomer giving a hard resin through ordinary polymerization or copolymerizlation.

Examples of the hard-resin producing monomer are aromatic vinyl compounds such as styrene and α-methyl styrene; alkyl methacrylates such as methyl methacrylate, ethyl methacrylate, and butyl methacrylate; vinyl cyanides such as acrylonitrile and methacrylonitrile; and vinyl halides such as vinyl chloride and vinyl bromide. These monomers can be used singly or in a mixture of two or more members.

Commonly known graft-copolymers prepared in the manner described above include, in addition to MBS resins and ABS resins, ABSM resins (acrylontrile-butadiene-styrene-methyl methacrylonitrile resins) and AAS resins (alkyl acrylates-acrylonitrile-styrene resins).

Next, a process for producing the graft-copolymer (B) for improving powder characteristics to be added to and blended with the above graft-copolymer (A) will be described.

The graft-copolymer (B) can be obtained by adding to a latex comprising 5 to 49 parts of an elastomeric trunk polymer which has been prepared by known emulsion polymerization 95 to 51 parts of a hard-resin producing monomer so that the total quantity of the graft-copolymer will amount to 100 parts; and then subjecting both to graft-polymerization.

For monomers constituting the elastomeric trunk polymer and hard resin, those which have been listed with reference to the process for producing the graft-copolymer (A) can be used.

If the quantity of the elastomeric trunk polymer is less than 5 parts per 100 parts of the graft-copolymer (B) for improving powder characteristics, the impact strength of a product formed of the resin composition will be lowered, or the effect of imparting high impact strength to a hard resin to be blended with the resin-composition will be impaired. Thus, the use of the graft-copolymer (B) comprising less than 5 parts of the elastomeric trunk copolymer is undesirable because the effect of imparting high impact strength of the resultant resin composition becomes poor, and, when PVC and like resins are blended therewith, numerous ugelled particles (fish eyes) will appear in film sheets obtained.

Conversely, in case the graft-copolymer comprising more than 49 parts of the elastomeric trunk polymer is employed, the effect of improving powder characteristics will be poor.

In the polymerization or graft-copolymerization of the trunk polymer required for the preparation of the graft-copolymer (A) or the graft-copolymer (B) for improving powder characteristics, a small quantity of a crosslinking agent, if desired, may be added. Further, when the graft-copolymer (A) or (B) is obtained through multi-stage polymerization, the composition and quantity of the monomers enumerated aboe may be varied in the respective polymerization stages insofar as the graft-copolymer (A) or (B) of the aforementioned composition can be finally obtained.

For the crosslinking agent mentioned above, monomers with two or more functional groups which are copolymerizable with the constituent monomers of the elastomeric trunk polymer or hard resin such as divinylbenzene, mono-, di-, tri- or tetraethylene glycol dimethacrylate and acrylate, and 1,3-butylene glycol diacrylate can be used in quantities up to 5 parts per 100 parts of the monomers to be polymerized in the respective stages.

If the crosslinking agent is added, the graft-copolymers (A) and (B) are more effectively dispersed in the resin blended therewith.

Both the graft-copolymer (A) and the graft-copolymer (B) for improvement purposes are obtained in latex form. While the concentrations of these copolymers are not specified, those ranging from 5 to 60% are commonly employed.

Hereinafter, methods of blending the graft-copolymer (A) with the graft-copolymer (B) for improvement purposes will be set forth.

The copolymers (A) and (B) are blended in either slurry form or dry state. The term "blending in slurry form" herein means that either one of the copolymers (A) and (B) is in slurry form when these copolymers are blended together, and both of the copolymers need not be in coagulated slurry form. It is preferred, however, not to blend the copolymers in latex form since no improved powder characteristics can be obtained.

Methods of blending in slurry form include a method which comprises adding the latex of one of the copolymers (A) and (B) to a coagulate (slurry) obtained by destroying the latex of the other copolymer through coagulation, i.e., coagulation with a salt or by freezing, and causing the graft-copolymer thus added to coagulate and precipitate on the surface of the slurry particles; and a method which comprises coagulating the latexes of the two copolymers separately, and mixing the coagulated slurries thus obtained. The resulting slurry mixture is dehydrated and dried, whereupon the powdery graft-copolymer composition of the present invention is obtained.

Methods of blending in dry state include a method which comprises first coagulating and drying the copolymer latexes to prepare powders of the copolymers (A) and (B), and then blending these powders with each other.

While the objects of the present invention can be achieved either by the blending in slurry form or by the blending of dry powders, the former blending method is preferable. Particularly, a graft-copolymer blend wherein the surfaces of the slurry particles of the graft-copolymer (A) obtained by destroying the latex of the same copolymer are evenly coated with the graft-copolymer (B) for improvement purposes is beneficial in order to obtain improved powder characteristics. This is because the blocking phenomenon and poor fluidity may be caused by the interaction among the surfaces of the particles of the graft-copolymer (A), and this interaction may be obstructed inasmuch as the particle surfaces are evenly coated with the graft-copolymer (B) for improving powder characteristics.

The resin with improved powder characteristics obtained in accordance with the above described method will be referred to hereinafter as a powdery copolymer resin blend or simply a copolymer blend.

The graft-copolymer (B) for improvement purposes is added in a quantity of 0.1 to 25 parts, preferably 0.5 to 5 parts, per 100 parts of the graft-copolymer (A). Less than 0.1 part of the copolymer (B) gives a copolymer blend with unsatisfactory powder characteristics, while the use of more than 25 parts of this copolymer is undesirable because the performance of the resulting copolymer blend as an impact strength modifier becomes poor.

If desired, the graft-copolymers (A) and (B) may further comprise known antioxidants, plasticizers and lubricants in conventional quantities.

The copolymer blend obtained in accordance with the present invention is found to have a remarkably improved fluidity and anti-blocking property as well as an increased bulk density. Accordingly, this copolymer blend not only minimizes troubles such as a blocking phenomenon during storage and clogging of transportation lines, but also ensures simplification of the structure of reservoirs, permitting the use of large-sized reservoirs and mass transportation systems.

The resin composition with improved impact strength according to the present invention can be obtained by blending 1 to 40 parts of the copolymer blend with 100 parts of a hard resin comprising a homopolymer or copolymer of the hard-resin producing monomers such as vinyl chloride resins, styrene resins and methyl methacrylate resins mentioned earlier. Less than 1 part of the copolymer blend results in poor effect of improving impact strength, while this blend in excess of 40 parts results in a resin composition with a low heat resistance and tensile strength and is therefore undesirable.

The copolymer blend of this invention can be formed by a known process singly or in a powder mixture with a hard resin.

In order to indicate more fully the nature and utility of this invention, the following specific examples of practice constituting preferred embodiments of the invention and comparison examples are set forth, it being understood that these examples are presented as illustrative only and not intended to limit the scope of the invention.

The methods of measuring the powder characteristics of the graft-copolymer and the copolymer blend and evaluating the properties of the PVC resin composition modified therewith are summarized in Table 1. The evaluation method of the properties set forth in Table 1 was applied to all the copolymers or copolymer blends as impact strength modifiers in Examples and Comparison Examples.

TABLE 1

[Measurement Method and Conditions]

A. Powder Characteristics of Graft-Copolymer and Copolymer Blend

Fluidity:

50 g of each powdery copolymer or copolymer blend was introduced into a bulk-densimeter used in accordance with JIS K-6721. Upon removal of the dumper, the flowing state of the copolymer was observed and the flow rate thereof measured.

(Rating of Flowing State)

o: The copolymer powder flowed spontaneously upon removal of the dumper.

Δ: The copolymer powder flowed spontaneously once it was caused to flow by impact.

x: The copolymer powder flowed when impact was applied continuously.

xx: The copolymer powder did not flow even when impact was applied continuously.

(Flow Rate) (measured for the powder rated o)

The time period in which the copolymer powder flowed out (sec./50 g).

Anti-blocking Property (Tablet Hardness):

0.5 g of each powdery copolymer or copolymer blend was pressed for 1 min. under a pressure of 5 Kg/cm$^2$ in a pelletizer to form the same into a tablet of a cross-sectional area of 1 cm$^2$. The minimum load (Kg) required for destroying this tablet was measured by means of a Kiya-type hardness meter.

Bulk Density:

The bulk density (g/ml) of 50 g of each powdery copolymer or copolymer blend was measured in accordance with JIS K-6721.

B. Properties of Resin Composition Obtained by Blending the Copolymer Blend with PVC Impact Strength (Izod Impact Strength):

12.5 parts of the graft-copolymer or copolymer blend was added to and blended with 87.5 parts of PVC of a degree of polymerization of 700 comprising 2 parts of a tin stabilizer (dioctyltin mercaptide) and 1 part of a lubricant (mixture of stearyl alcohol and a montanic acid ester). The compound thus obtained was kneaded for 3 min. with rolls having a surface temperature of 160° C., and pressed for 7 min. at 195° C. to prepare a resin specimen of 6 mm thickness. The Izod impact strength (Kg·cm/cm) of this specimen was measured in accordance with JIS K-7110.

Fish Eyes:

A T-die sheet of 0.1 mm thickness was prepared from the above PVC compound for the impact strength measurement. The number of fish eyes per 23×1000 mm of this sheet was measured (number/23×1000 mm).

EXAMPLE 1

Preparation of Graft-Copolymer A-1

A monomer mixture comprising 0.06 part of diisopropylbenzene hydroperoxide, 50 parts of butadiene mixed with 0.65 part of divinylbenzene, and 15 parts of styrene; 0.11 parts of sodium pyrophosphate; 0.002 part of ferric sulfate; 0.003 part of EDTA (disolium ethylenediaminetetraacetate); 0.03 part of formaldehyde sodium sulfoxylate; and 150 parts of distilled water mixed with 0.75 part of potassium oleate were charged into an autoclave provided with a stirrer. The resulting mixture was subjected to polymerization at 60° C. for 13 hours.

To the elastomeric trunk polymer latex thus obtained, 0.065 part of dioctyl sodium sulfosuccinate and then 30 parts of 0.2% hydrochloric acid were added, whereupon the average particle size of the latex was increased to about 0.15μ.

To this latex (solids content: 65 parts), a monomer mixture comprising 0.02 part of diisopropylbenzene hydroperoxide, 15 parts of styrene mixed with 0.1 part of divinylbenzene, and 12.5 parts of methyl methacrylate, and 0.02 part of formaldehyde sodium sulfoxylate were added, and the mixture was subjected to polymerization at 60° C. for 3 hours.

To the polymer obtained, 0.008 part of diisopropylbenzene hydroperoxide, 7.5 parts of methyl methacrylate mixed with 0.04 part of divinylbenzene, and 0.008 part of formaldehyde sodium sulfoxylate were further added, and the resulting mixture was subjected to polymerization at 60° C. for 5 hours to obtain a latex of Graft-Copolymer A-1 (solids content: 100 parts).

Preparation of Graft-Copolymer B-1 for Improvement Purposes

To the elastomeric trunk polymer latex (solids content: 30 parts) used in the preparation of the above described graft-copolymer, a monomer mixture comprising 0.045 part of diisopropylbenzene hydroperoxide, 31 parts of styrene mixed with 0.225 part of divinylbenzene, and 14 parts of methyl methacrylate; 0.06 part of sodium pyrophosphate; 0.0011 part of ferric sulfate; 0.0018 part of EDTA; 0.045 part of formaldehyde sodium sulfoxylate; and 231 parts of distilled water mixed with 0.5 part of potassium oleate were added, and the mixture was subjected to polymerization at 60° C. for 4 hours.

To the polymer thus obtained, 0.025 part of diisopropylbenzene hydroperoxide, 25 parts of methyl methacrylate mixed with 0.125 part of divinylbenzene, and 0.025 part of formaldehyde sodium sulfoxylate were further added, and the mixture was subjected to polymerization at 60° C. for 5 hours to obtain a latex of Graft-Copolymer B-1 (solids content: 100 parts).

Blending of Graft-Copolymer (A) with Graft-Copolymer (B) for Improvement Purposes The latex of Graft-Copolymer A-1 (solids content: 100 parts) was added to 300 parts of 0.2% hydrochloric acid at 60° C. with stirring to destroy the latex to form a slurry. To the slurry obtained, a 2% aqueous solution of sodium hydroxide was added to adjust the pH thereof to 6.0, and thereafter the slurry was heated to 90° C.

This slurry was then cooled to 60° C., to which 10% hydrochloric acid was added to adjust the pH thereof to 2.0. To the resultant slurry, 0.2 part of ditertiary butyl cresol and an emulsion of 2 parts of epoxidized soybean oil mixed with 0.2 part of dilaurylthio diproprionate were added to stabilize the slurry. Thereafter, a latex of Graft-Copolymer B-1 (solids content: 1 part) for improvement purposes was added to this slurry, and the mixture was coagulated. The mixture thus obtained was dehydrated and dried to prepare a powdery copolymer blend.

COMPARISON EXAMPLE 1

The graft-copolymer slurry obtained in Example 1 was directly dehydrated and dried to prepare powdery Graft-Copolymer A-1 comprising no graft-copolymer for improvement purposes.

The properties of the powdery copolymers respectively prepared in Example 1 and Comparison Example 1 were measured in accordance with the methods set forth in Table 1. The results obtained are summarized in Table 2 which will be shown hereinlater.

The powdery graft-copolymer of Comparison Example 1 did not flow spontaneously, and the tablet hardness thereof was as high as 0.9 Kg which showed a poor anti-blocking property. In contrast, the graft-copolymer of Example 1 flowed spontaneously at a rate of 33 sec./50 g which showed improved fluidity, and the tablet hardness thereof was 0.30 Kg which demonstrated a notably improved anti-blocking property. Further, this graft-copolymer had an increased bulk density.

With reference to the effect of imparting improved impact strength, the graft-copolymers of Example 1 and Comparison Example 1 showed substantially the same result, from which it was noted that the addition of the graft-copolymer for improvement purposes did not appreciably affect the impact strength.

EXAMPLES 2 AND 3

Powdery copolymer blends were prepared in the same manner as in Example 1 except that the quantity of the Graft-Copolymer B-1 for improvement purposes used therein was increased to 2 parts (Example 2) and 4 parts (Example 3), respectively. The powder characteristics and performance as impact strength modifiers for PVC of the copolymer blends thus prepared are set forth in Table 2. The fluidity and anti-blocking property of each of the copolymer blends were improved and the bulk density thereof was increased as the quantity of the graft-copolymer for improvement purposes added to the graft-copolymer was increased. On the other hand, the performance of these copolymer blends as impact strength modifiers for PVC was not substantially impaired.

10 parts each of the copolymers of Example 2 and Comparison Example 1 were blended with 100 parts each of PVC ($\overline{P}=600$) which had been mixed with 2 parts of octyltin mercaptide, 0.8 part of stearyl alcohol, and 0.2 part of a montanic acid ester to obtain Compound A (Example 2) and Compound B (Comparison Example 1).

These compounds were respectively formed into 500-cc bottles through a 50-mm$\phi$ extruder, and the formabilities of the Compounds and the properties of the bottles were compared with each other. As a result, the Compound A was found to have a lower melting temperature than the Compound B and the quality of the extruded compound was also greater in the former case. Further, the Compound A had a slightly better appearance (transparency and gloss), and also showed a better impact resistance when the bottles filled with water were subjected to a drop test.

EXAMPLES 4 TO 6 AND COMPARISON EXAMPLE 2

Graft-Copolymer B-2 for improvement purposes was prepared by using 45 parts of an elastomeric trunk polymer. The Graft-Copolymer B-2 thus obtained in quantities of 5 parts (Example 4), 10 parts (Example 5), 20 parts (Example 6), and 30 parts (Comparison Example 2), respectively, was added to 100 parts each of the Graft-Copolymer A-1 described in Example 1 in accordance with the blending method set forth in Example 1 to obtain powdery copolymer blends. The powder characteristics and performance as impact strength modifiers for PVC of these copolymer blends are shown in Table 2.

The fluidity and anti-blocking property of each of the copolymer blends were improved as the quantity of the Graft-Copolymer B-2 for improvement purposes added to the Graft-Copolymer A-1 was increased. When this quantity was 30 parts or more (Comparison Example 2), however, the effect of imparting impact strength became poorer.

EXAMPLES 7 TO 9 AND COMPARISON EXAMPLES 3 AND 4

In order to demonstrate the influence of the content of the elastomeric trunk polymer constituting the base polymer of the graft-copolymer for improvement purposes, Examples 7 to 9 and Comparison Examples 3 and 4 are included in Table 2.

By modifying only the monomer blending ratio employed in Example 1 as set forth in the footnotes to Table 2, graft-copolymers for improvement purposes comprising 0% (B-6), 5% (B-3), 20% (B-4), 40% (B-5), and 50% (B-7), respectively, of an elastomeric trunk polymer were prepared.

Of these graft-copolymers, the copolymer comprising methyl methacrylate and styrene alone and no elastomeric trunk polymer (Comparison Example 3) possessed a notably poor effect of imparting impact strength to PVC, and a PVC resin composition obtained therefrom had numerous fish eyes, while the graft-copolymer comprising more than 50% of an elastomeric trunk polymer (Comparison Example 4) exhibited a poor effect of improving powder characteristics.

EXAMPLES 10 THROUGH 13 AND COMPARISON EXAMPLES 5 AND 6

In order to show the influence of the content of the elastomeric trunk polymer constituting the base polymer of the graft-copolymer (A) on the powder characteristics thereof, Examples 10 through 13 and Comparison Examples 5 and 6 are set forth in Table 3.

Graft-Copolymers A-2 and A-3 were prepared in accordance with the process for the preparation of the graft-copolymer (A) described in Example 1 except that the monomer blending ratio was modified as indicated in the footnotes to Table 3.

Comparison Example 5 was a graft-copolymer comprising 55% of an elastomeric trunk polymer (Graft-Copolymer A-2), and Comparison Example 6 was a graft-copolymer comprising 75% of an elastomeric trunk polymer (Graft-Copolymer A-3).

In Examples 10 through 13, copolymer blends were prepared by blending 2 parts each of the Graft-Copolymer B-1 or B-4 for improvement purposes obtained in the manner described earlier with the Graft-Copolymer A-2 or A-3.

As the content of the elastomeric trunk polymer in the graft-copolymer (A) was increased, a higher effect of imparting impact strength to PVC could be obtained but the powder characteristics of the copolymer exhibited a tendency to deterioration on the other hand (Comparison Examples 5 and 6).

However, the copolymer blends prepared by the addition of 2 parts each of the Graft-Copolymer B-1 for improvement purposes (Examples 10 and 11) and 2 parts each of the Graft-Copolymer B-4 for the same purposes (Examples 12 and 13) to the above Graft-Copolymers A-2 and A-3 in the same manner as in Example 1 possessed better powder characteristics than the Graft-Copolymer A-2 (Comparison Example 5) as is apparent from Table 3. Thus, copolymer blends further possessing a remarkable effect of imparting impact strength can be easily obtained in accordance with the process of the present invention.

EXAMPLES 14 THROUGH 17 AND COMPARISON EXAMPLES 7 AND 8

Graft copolymers (A) were prepared by the process set forth in Example 1 except that elastomeric trunk polymers of varying latex particle sizes obtained by the addition of varying quantities of 0.2% hydrochloric acid as a coagulant.

Comparison Example 7 represents Graft-Copolymer A-1-1 comprising an uncoagulated elastomeric trunk polymer as the base polymer, and Comparison Example 8 represents Graft-Copolymer A-1-2 obtained by adding 15 parts of 0.2% hydrochloric acid as a coagulant for the elastomeric trunk polymer latex thereby to coagulate and enlarge the particles of the elastomeric trunk polymer latex.

As the particle size of the coagulated elastomeric trunk polymer latex was increased (due to an increased quantity of a coagulant), the powder characteristics, particularly anti-blocking property, of the graft-copolymer obtained was improved slightly and not yet significantly.

The copolymer blends prepared by the addition of 2 parts each of the Graft-Copolymer B-1 for improvement purposes (Examples 14 and 15) and 2 parts each of the Graft-Copolymer B-4 for the same purposes (Examples 16 and 17) to the above graft-copolymers in the same manner as in Example 1 exhibited markedly improved powder characteristics as is set forth in Table 3.

EXAMPLES 18 TO 20 AND COMPARISON EXAMPLE 9

Preparation of Graft-Copolymer A-4

A monomer mixture comprising 0.06 part of diisopropylbenzene hydroperoxide, 50 parts of 2-ethylhexyl acrylate mixed with 0.65 part of ethylene glycol dimethacrylate, and 15 parts of butadiene; 0.1 part of sodium pyrophosphate; 0.002 part of ferric sulfate; 0.003 part of EDTA; 0.06 part of formaldehyde sodium sulfoxylate; and 150 parts of distilled water mixed with 0.75 part of potassium oleate were charged into an autoclave provided with a stirrer. The resulting mixture was subjected to polymerization at 60° C. for 13 hours to obtain a latex of a crosslinked alkyl acrylate-butadiene elastomeric trunk polymer.

To the latex (solids content: 65 parts) thus obtained, a monomer mixture comprising 0.02 part of diisopropylbenzene, 4 parts of acrylonitrile mixed with 0.15 part of ethylene glycol dimethacrylate, 11 parts of styrene, and 5 parts of methyl methacrylate, and 0.01 part of formaldehyde sodium sulfoxylate were added, and the mixture was subjected to polymerization at 60° C. for 3 hours.

To the polymer obtained, 0.015 part of diisopropylbenzene hydroperoxide, 15 parts of methyl methacrylate mixed with 0.11 part of ethylene glycol dimethacrylate, and 0.01 part of formaldehyde sodium sulfoxylate were further added, and the mixture was subjected to polymerization at 60° C. for 5 hours to obtain a latex of Graft-Copolymer A-4.

Preparation of Graft-Copolymer B-8 for Improvement Purposes

To the latex of the elastomeric trunk polymer of the Graft-Copolymer A-4 (solids content: 30 parts), a monomer mixture comprising 0.045 part of diisopropylbenzene hydroperoxide, 10 parts of acrylonitrile mixed with 0.34 part of ethylene glycol dimethacrylate, 17.5 parts of styrene, and 17.5 parts of methyl methacrylate; 0.054 part of sodium pyrophosphate; 0.0011 part of ferric sulfate, 0.016 part of EDTA; 0.025 part of formaldehyde sodium sulfoxylate; and 231 parts of distilled water mixed with 0.5 part of potassium oleate were added, and the mixture was subjected to polymerization at 60° C. for 4 hours.

To the polymer obtained, 0.025 part of diisopropylbenzene hydroperoxide, 25 parts of methyl methacrylate mixed with 0.11 part of ethylene glycol dimethacrylate, and 0.025 part of formaldehyde sodium sulfoxylate were added, and the mixture was further subjected to polymerization at 60° C. for 5 hours to obtain a latex of Graft-Copolymer B-8.

Blending

To 100 parts of Graft-Copolymer A-4 in slurry form, 2 parts of Graft-Copolymer B-8 for improvement purposes in latex form was added in accordance with the method described in Example 1 to obtain a powdery copolymer blend (Example 18).

Similarly, copolymer blends were prepared by replacing the latex of the Graft-Copolymer B-8 with a latex of the aforementioned Graft-Copolymer B-1 for improvement purposes (Example 19), and with a latex of Graft-Copolymer B-4 for the same purposes (Example 20).

As is apparent from Table 4, all of these copolymer blends yielded the desired results. The powder characteristics of Comparison Example 9 consisting solely of Graft-Copolymer A-4 are also shown in Table 4.

EXAMPLES 21 THROUGH 24 AND COMPARISON EXAMPLES 10 THROUGH 13

Graft-Copolymers A-5, A-6, A-7 and A-8 were prepared by the procedure of Example 18 except that a crosslinked homopolymer of 2-ethylhexyl acrylate obtained through emulsion polymerization using 1% of 1,3-butanediol dimethacrylate as the crosslinking agent, a crosslinked copolymer comprising 55% of 2-ethylhexyl acrylate, 30% of butadiene, and 15% of methyl methacrylate obtained by using 1% of ethyleneglycol dimethacrylate, a crosslinked homopolymer of butyl acrylate obtained by using 1% of 1,3-butanediol dimethacrylate as the crosslinking agent, and a crosslinked homopolymer of butadiene obtained by using 1% of divinylbenzene as the crosslinking agent were respectively used as elastomeric trunk polymers. These graft-copolymers alone are shown in Table 4 as Comparison Examples 10 through 13, all of which exhibited poor powder characteristics.

Copolymer blends (Examples 21 through 24) obtained by adding to these copolymers 2 parts each of Graft-Copolymer B-8 for improvement purposes in accordance with the blending method set forth in Example 18 exhibited markedly improved fluidity and anti-blocking property as well as an increased bluk density.

EXAMPLES 25 THROUGH 28

Graft-Copolymers B-9, B-10, B-11 and B-12 for improvement purposes were prepared by the procedure of Example 18 for the production of Graft-Copolymer B-8 except that the corsslinked homopolymer of 2-ethylhexyl acrylate, the crosslinked copolymer comprising 55% of 2-ethylhexyl acrylate, 30% of butadiene, and 15% of methyl methacrylate, the crosslinked homopolymer of butyl acrylate, and the crosslinked homopolymer of butadiene as used in the production of Graft-Copolymers A-5 through A-8 were respectively used as elastomeric trunk polymers.

2 parts each of the Graft-Copolymers B-9 through B-12 for improvement purposes thus prepared were respectively added to 100 parts each of Graft-Copolymer A-4 in the same manner as in Example 18 to obtain copolymer blends (Examples 25 through 28).

As is apparent from Table 5, all of these copolymer blends were found to have notably improved powder characteristics.

EXAMPLES 29 AND 30

The influence of the difference in blending methods on the powder characteristics was examined by using Graft-Copolymer A-1 and Graft-Copolymer B-1 for improvement purposes.

Copolymer blends of Examples 29 and 30 which are shown in Table 5 were obtained respectively by coagulating latexes of the above graft-copolymers separately through the procedure as used in Example 1 and then blending the coagulates (slurries) with each other (Example 29), and by preparing powders of the polymers separately and then blending the powders with each other (Example 30).

Both the blending methods provided improved powder characteristics, but are somewhat inferior to the method of Example 2.

COMPARISON EXAMPLES 14 AND 15

100 parts of a graft-copolymer (A) was blended with 2 parts of a graft-copolymer (B) for improvement purposes while the both being in latex form, and the blended copolymers were subsequently coagulated, dehydrated and dried in the same manner as in Example 1 to obtain a powdery copolymer blend.

Comparison Example 14 was prepared from a combination of Graft-Copolymer A-1 and Graft-Copolymer B-1 for improvement purposes, and Comparison Example 15 from a combination of Graft-Copolymer A-4 and Graft-Copolymer B-8 for the same purposes.

Comparison Examples 14 and 15 could be compared with Examples 2 and 18, respectively. The results obtained show that the latex blending provides a poorer effect of improving powder characteristics.

TABLE 2

| | Ex. 1 | Ex. 2 | Ex. 3 | Com. Ex. 1 | Ex. 4 | Ex. 5 | Ex. 6 | Com. Ex. 2 | Ex. 7 | Ex. 8 | Ex. 9 | Com. Ex. 3 | Com. Ex. 4 |
|---|---|---|---|---|---|---|---|---|---|---|---|---|---|
| Composition of Graft-Copolymer & Copolymer Blend | | | | | | | | | | | | | |
| (1) Graft-Copolymer (A) | | | | | | | | | | | | | |
| Type | A-1 | A-1 | A-1 | A-1 | A-1 | A-1 | A-1 | A-1 | A-1 | A-1 | A-1 | A-1 | A-1 |
| Elastomeric Trunk Polymer/Hard Resin Ratio (%) | 65/35 | 65/35 | 65/35 | 65/35 | 65/35 | 65/35 | 65/35 | 65/35 | 65/35 | 65/35 | 65/35 | 65/35 | 65/35 |
| (2) Graft-Copolymer (B) for Improvement Purposes | | | | | | | | | | | | | |
| Type | B-1 | B-1 | B-1 | — | B-2*[1] | B-2 | B-2 | B-2 | B-3*[2] | B-4*[3] | B-5*[4] | B-6*[5] | B-7*[6] |
| Elastomeric Trunk Polymer/Hard Resin Ratio (%) | 30/70 | 30/70 | 30/70 | — | 45/55 | 45/55 | 45/55 | 45/55 | 5/95 | 20/80 | 40/60 | 0/100 | 50/50 |
| Quantity Added (per 100 parts of (A)) (part) | 1 | 2 | 4 | — | 5 | 10 | 20 | 30 | 2 | 2 | 2 | 2 | 2 |
| Powder Characteris- | | | | | | | | | | | | | |

TABLE 2-continued

|  | Ex. 1 | Ex. 2 | Ex. 3 | Com. Ex. 1 | Ex. 4 | Ex. 5 | Ex. 6 | Com. Ex. 2 | Ex. 7 | Ex. 8 | Ex. 9 | Com. Ex. 3 | Com. Ex. 4 |
|---|---|---|---|---|---|---|---|---|---|---|---|---|---|
| tics of Graft-Copolymer & Copolymer Blend | | | | | | | | | | | | | |
| (1) Fluidity | | | | | | | | | | | | | |
| Flowing State | o | o | o | xx | o | o | o | o | o | o | o | o | Δ |
| Flow Rate (sec./50g) | 33 | 25 | 17 | — | 30 | 27 | 25 | 23 | 20 | 23 | 25 | 20 | — |
| (2) Anti-Blocking Property | | | | | | | | | | | | | |
| Tablet Hardness (Kg) | 0.30 | 0.20 | 0.05 | 0.90 | 0.40 | 0.35 | 0.30 | 0.30 | 0.10 | 0.15 | 0.30 | 0.20 | 0.60 |
| (3) Bulk Density (g/ml) | 0.32 | 0.35 | 0.37 | 0.27 | 0.33 | 0.33 | 0.33 | 0.33 | 0.35 | 0.34 | 0.32 | 0.34 | 0.30 |
| Properties of PVC Resin Composition | | | | | | | | | | | | | |
| Impact Strength | | | | | | | | | | | | | |
| Izod Impact Strength (Kg·cm/cm) | 95 | 95 | 92 | 97 | 95 | 94 | 91 | 53 | 88 | 95 | 101 | 65 | 96 |
| Number of Fish Eyes (number/23$^{mm}$ × 1000$^{mm}$) | 16 | 15 | 18 | 15 | 20 | 17 | 19 | 22 | 23 | 17 | 17 | 100 or more | 18 |

*[1] (B/S) ← (S/M) ← M : (35/10) ← (23/7) ← (25)
*[2] (B/S) ← (S/M) ← (M) : (3.5/1.5) ← (43/27) ← (25)
*[3] (B/S) ← (S/M) ← M : (14/6) ← (36/19) ← (25)
*[4] (B/S) ← (S/M) ← (M) : (28/12) ← (27/8) ← (25)
*[5] (S/M) ← M : (45/30) ← (25)
*[6] (B/S) ← (S/M) ← (M) : (35/15) ← (22.5/2.5) ← (25)
B : Butadiene, S : Styrene, M : Methyl Methacrylate (as in all succeeding tables).

TABLE 3

|  | Ex. 10 | Ex. 11 | Ex. 12 | Ex. 13 | Com. Ex. 5 | Com. Ex. 6 | Ex. 14 | Ex. 15 | Ex. 16 | Ex. 17 | Com. Ex. 7 | Com. Ex. 8 |
|---|---|---|---|---|---|---|---|---|---|---|---|---|
| Composition of Graft-Copolymer & Copolymer Blend | | | | | | | | | | | | |
| (1) Graft-Copolymer (A) | | | | | | | | | | | | |
| Type | A-2*[1] | A-3*[2] | A-2 | A-3 | A-2 | A-3 | A-1-1 | A-1-2 | A-1-1 | A-1-2 | A-1-1 | A-1-2 |
| Elastomeric Trunk Polymer/Hard Resin Ratio (%) | 55/45 | 75/25 | 55/45 | 75/25 | 55/45 | 75/25 | 65/35 | 65/35 | 65/35 | 65/35 | 65/35 | 65/35 |
| (2) Graft-Copolymer (B) for Improvement Purposes | | | | | | | | | | | | |
| Type | B-1 | B-1 | B-4 | B-4 | — | — | B-1 | B-1 | B-4 | B-4 | — | — |
| Elastomeric Trunk Polymer/Hard Resin Ratio (%) | 30/70 | 30/70 | 20/80 | 20/80 | — | — | 30/70 | 30/70 | 20/80 | 20/80 | — | — |
| Quantity Added (per 100 parts of (A)) (Part) | 2 | 2 | 2 | 2 | — | — | 2 | 2 | 2 | 2 | — | — |
| Powder Characteristics of Graft-Copolymer & Copolymer Blend | | | | | | | | | | | | |
| (1) Fluidity | | | | | | | | | | | | |
| Flowing State | o | o | o | o | x | xx | o | o | o | o | xx | xx |
| Flow Rate (sec./50 g) | 20 | 35 | 20 | 35 | — | — | 30 | 30 | 25 | 25 | — | — |
| (2) Anti-Blocking Property | | | | | | | | | | | | |
| Tablet Hardness (Kg) | 0.15 | 0.35 | 0.10 | 0.30 | 0.60 | 1.20 | 0.25 | 0.25 | 0.25 | 0.20 | 1.50 | 1.10 |
| (3) Bulk Density (g/ml) | 0.34 | 0.34 | 0.36 | 0.35 | 0.28 | 0.25 | 0.34 | 0.33 | 0.34 | 0.33 | 0.28 | 0.29 |
| Properties of PVC Resin Composition | | | | | | | | | | | | |
| Impact Strength | | | | | | | | | | | | |
| Izod Impact Strength (kg·cm/cm) | 70 | 95 | 68 | 94 | 73 | 105 | 40 | 65 | 38 | 65 | 41 | 73 |
| Number of Fish Eyes (number/23$^{mm}$ × 1000$^{mm}$) | 15 | 17 | 22 | 14 | 11 | 15 | 20 | 12 | 16 | 17 | 21 | 23 |

*[1] (B/S) ← (S/M) ← (M) : (39/16) ← (21/17) ← (7)
*[2] (B/S) ← (S/M) ← (M) : (53/22) ← (11/7) ← (7)

TABLE 4

|  | Ex. 18 | Ex. 19 | Ex. 20 | Com. Ex. 9 | Ex. 21 | Ex. 22 | Ex. 23 | Ex. 24 | Com. Ex. 10 | Com. Ex. 11 | Com. Ex. 12 | Com. Ex. 13 |
|---|---|---|---|---|---|---|---|---|---|---|---|---|
| Composition of Graft-Copolymer & Copolymer Blend | | | | | | | | | | | | |
| (1) Graft-Copolymer (A) | | | | | | | | | | | | |
| Type | A-4 | A-4 | A-4 | A-4 | A-5 | A-6 | A-7 | A-8 | A-5 | A-6 | A-7 | A-8 |
| Elastomeric Trunk Polymer/Hard Resin Ratio (%) | 65/35 | 65/35 | 65/35 | 65/35 | 65/35 | 65/35 | 65/35 | 65/35 | 65/35 | 65/35 | 65/35 | 65/35 |
| (2) Graft-Copolymer (B) for Improvement Purposes | | | | | | | | | | | | |
| Type | B-8 | B-1 | B-4 | — | B-8 | B-8 | B-8 | B-8 | — | — | — | — |
| Elastomeric Trunk Poly- | | | | | | | | | | | | |

TABLE 4-continued

|  | Ex. 18 | Ex. 19 | Ex. 20 | Com. Ex. 9 | Ex. 21 | Ex. 22 | Ex. 23 | Ex. 24 | Com. Ex. 10 | Com. Ex. 11 | Com. Ex. 12 | Com. Ex. 13 |
| --- | --- | --- | --- | --- | --- | --- | --- | --- | --- | --- | --- | --- |
| mer/Hard Resin Ratio (%) | 30/70 | 30/70 | 20/80 | — | 30/70 | 30/70 | 30/70 | 30/70 | — | — | — | — |
| Quantity Added (per 100 parts of (A)) (part) | 2 | 2 | 2 | — | 2 | 2 | 2 | 2 | — | — | — | — |
| Powder Characteristics of Graft-Copolymer & Copolymer Blend | | | | | | | | | | | | |
| (1) Fluidity | | | | | | | | | | | | |
| Flowing State | o | o | o | xx | o | o | o | o | xx | xx | xx | xx |
| Flow Rate (sec./50 g) | 30 | 30 | 25 | — | 27 | 23 | 25 | 28 | — | — | — | — |
| (2) Anti-Blocking Property | | | | | | | | | | | | |
| Tablet Hardness (Kg) | 0.25 | 0.25 | 0.20 | 1.44 | 0.19 | 0.24 | 0.21 | 0.25 | 1.42 | 1.39 | 1.40 | 1.45 |
| (3) Bulk Density (g/ml) | 0.33 | 0.33 | 0.35 | 0.26 | 0.36 | 0.35 | 0.35 | 0.33 | 0.27 | 0.25 | 0.23 | 0.25 |
| Properties of PVC Resin Composition | | | | | | | | | | | | |
| Impact Strength | | | | | | | | | | | | |
| Izod Impact Strength (Kg · cm/cm) | 50 | 52 | 48 | 55 | 51 | 47 | 52 | 53 | 53 | 50 | 53 | 55 |
| Number of Fish Eyes (number/23$^{mm}$ × 1000$^{mm}$) | 22 | 17 | 16 | 23 | 16 | 14 | 13 | 21 | 23 | 25 | 21 | 19 |

TABLE 5

|  | Ex. 25 | Ex. 26 | Ex. 27 | Ex. 28 | Ex. 29 | Ex. 30 | Com. Ex. 14 | Com. Ex. 15 |
| --- | --- | --- | --- | --- | --- | --- | --- | --- |
| Composition of Graft-Copolymer & Copolymer Blend | | | | | | | | |
| (1) Graft-Copolymer (A) | | | | | | | | |
| Type | A-4 | A-4 | A-4 | A-4 | A-1 | A-1 | A-1 | A-1 |
| Elastomeric Trunk Polymer/Hard Resin Ratio (%) | 65/35 | 65/35 | 65/35 | 65/35 | 65/35 | 65/35 | 65/35 | 65/35 |
| (2) Graft-Copolymer (B) for Improvement Purposes | | | | | | | | |
| Type | B-9 | B-10 | B-11 | B-12 | B-1 | B-1 | B-1 | B-8 |
| Elastomeric Trunk Polymer/Hard Resin Ratio (%) | 30/70 | 30/70 | 30/70 | 30/70 | 30/70 | 30/70 | 30/70 | 30/70 |
| Quantity Added (per 100 parts of (A)) (part) | 2 | 2 | 2 | 2 | 2 | 2 | 2 | 2 |
| Powder Characteristics of Graft-Copolymer & Copolymer Blend | | | | | | | | |
| (1) Fluidity | | | | | | | | |
| Flowing State | o | o | o | o | o | o | xx | xx |
| Flow Rate (sec./50 g) | 26 | 29 | 31 | 24 | 27 | 30 | — | — |
| (2) Anti-Blocking Property | | | | | | | | |
| Tablet Hardness (Kg) | 0.21 | 0.19 | 0.20 | 0.23 | 0.43 | 0.46 | 0.87 | 1.38 |
| (3) Bulk Density (g/ml) | 0.36 | 0.38 | 0.35 | 0.34 | 0.33 | 0.32 | 0.28 | 0.26 |
| Properties of PVC Resin Composition | | | | | | | | |
| Impact Strength | | | | | | | | |
| Izod Impact Strength (Kg · cm/cm) | 50 | 53 | 51 | 52 | 95 | 97 | 90 | 53 |
| Number of Fish Eyes number/23$^{mm}$ × 1000$^{mm}$) | 19 | 14 | 18 | 22 | 27 | 13 | 15 | 24 |

We claim:

1. A powdery graft-copolymer composition comprising a blend of
    100 parts of a graft-copolymer (A) comprising 50 to 80% of an elastomeric trunk polymer, and 50 to 20% of a branch polymer of a hard-resin producing monomer grafted on the elastomeric trunk polymer; and
    0.1 to 25 parts of a graft-copolymer (B) comprising 5 to 49% of an elastomeric trunk polymer, and 95 to 51% of a branch polymer of a hard-resin producing monomer grafted on the elastomeric trunk polymer,
both the graft-copolymers (A) and (B) having been obtained through emulsion graft-copolymerication, and wherein said graft-copolymer composition has been obtained by blending the graft-copolymers (A) and (B) in slurry form followed by drying all quantities expressed in parts and percentages being by weight.

2. A powdery graft-copolymer composition as claimed in claim 1, wherein the graft-copolymer composition has been obtained by drying a slurry mixture obtained by adding a latex of a graft-copolymer (B) to a slurry of the graft-copolymer (A) and coagulating the same, said slurry of the graft-copolymer (A) having been prepared through the coagulation of a latex of the graft-copolymer (A).

3. A powdery graft-copolymer composition as claimed in claim 1, wherein the graft-copolymer composition has been obtained by drying a slurry mixture obtained by adding a latex of the graft-copolymer (A) to a slurry of the graft-copolymer (B) and coagulating the same, said slurry of the graft-copolymer (B) having been prepared through the coagulation of a latex of the graft-copolymer (B).

4. A powdery graft-copolymer composition as claimed in claim 1, wherein the graft-copolymer composition has been obtained by mixing slurries of the graft-copolymers (A) and (B) respectively obtained by coagulation of latexes of the graft-copolymers (A) and (B), and drying the slurry mixture thus obtained.

5. A powdery graft-copolymer composition as claimed in claim 1, wherein the elastomeric trunk polymer is selected from polymers of elastomer-producing monomers selected from butadiene, isoprene, chloroprene, and alkyl acrylates having 4 to 10 carbon atoms, and copolymers of said elastomer-producing monomers and monomers copolymerizable therewith.

6. A powdery graft-copolymer composition as claimed in claim 1, wherein the hard-resin producing monomer is selected from styrene, α-methyl styrene, methyl methacrylate, ethyl methacrylate, methyl acrylate, ethyl acrylate, acrylonitrile, methacrylonitrile, and vinyl chloride.

7. A resin composition with improved impact strength comprising a copolymer composition as claimed in claim 1 and a hard resin.

8. A resin composition as claimed in claim 7, wherein the hard resin is a vinyl chloride resin selected from polyvinyl chloride and copolymers of vinyl chloride as a principal constituent and monomers copolymerizable therewith.

* * * * *